(12) United States Patent
Taylor

(10) Patent No.: US 6,862,351 B2
(45) Date of Patent: Mar. 1, 2005

(54) MONITORING SYSTEM FOR A COMMUNICATION NETWORK

(75) Inventor: William Scott Taylor, Duluth, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 453 days.

(21) Appl. No.: 10/139,579

(22) Filed: May 6, 2002

(65) Prior Publication Data

US 2003/0206620 A1 Nov. 6, 2003

(51) Int. Cl.[7] .......................... H04M 7/00; H04M 1/24; H04M 3/08
(52) U.S. Cl. ............................... 379/221.06; 379/9.01; 379/9.04
(58) Field of Search ................................ 379/9.01, 9.03, 379/9.04, 221.03, 221.04, 221.06, 221.07, 229, 279; 707/3, 4; 714/45, 48, 49, 57; 717/127

(56) References Cited

U.S. PATENT DOCUMENTS

| | | | |
|---|---|---|---|
| 5,953,389 A | 9/1999 | Pruett et al. | 379/9 |
| 6,091,712 A | 7/2000 | Pope et al. | 370/244 |
| 6,295,540 B1 | 9/2001 | Sanschagrin et al. | 707/201 |
| 6,321,224 B1 * | 11/2001 | Beall et al. | 707/5 |
| 6,698,013 B1 * | 2/2004 | Bertero et al. | 717/127 |
| 2003/0061068 A1 * | 3/2003 | Curtis | 705/1 |

OTHER PUBLICATIONS

Graham, Alvin G., "Power System Monitoring in a Network Environment," IEEE, pp. 515–522 (Nov. 1991).
Seldner, Michael, Network Monitoring and Analysis– Context, System Requirements and Prototype, IEEE, pp. 2030–2034 (1987).
Sticker, Harry, Network Monitoring and Analysis (NMA)– An Advanced Network Monitoring Tool, IEEE, pp. 1290–1294 (1986).

* cited by examiner

Primary Examiner—Benny Tieu
(74) Attorney, Agent, or Firm—Jones Day

(57) ABSTRACT

In accordance with another aspect of the invention defined by the claims, a monitoring system for a communication network having a plurality of network elements is provided. The monitoring system comprises a communication subsystem for receiving a first message from a first network element, a database for storing a plurality of data records relating to facilities provided by the communication network or equipment provisioned in the communication network, a message matching module, and a translation module. The message matching module is operative to cause the monitoring system to associate the received first message to one of the data records. The message matching module is also operative to cause the monitoring system to extract identification information from the first message and to use the identification information to select said one of the data records wherein the selected data record corresponds to the facility or the equipment in the communication network that relates to the received first message. The translation module is applied in connection with the message matching module to allow the monitoring system to use the identification information to select said one of the data records. The translation module is operative to allow the monitoring system to convert the identification information into search terms for selecting one of the data records from the database.

38 Claims, 10 Drawing Sheets

| NMA UNIVERSAL | |
|---|---|
| entity_type | office_equip |
| location | bwlgkymak35 |
| equipment code | tlmbd8sl |
| rr/bay | 0100.13 |
| unit/shelf | 000101 |

| NMA UNIVERSAL | |
|---|---|
| entity_type | office_equip |
| location | bwlgkymak35 |
| equipment code | tlmbd8sl |
| rr/bay | 0100.13 |
| unit/shelf | 000101 |
| SID | bwljkmak25 |
| AID | 0001-01 |

MONITORING SYSTEM FOR A COMMUNICATION NETWORK

BACKGROUND

1. Field of the Invention

This invention relates generally to telecommunication networks. More particularly, the invention relates to a system and method for monitoring network elements in a telecommunications network.

2. Description of the Related Art

Many telecommunication networks are monitored for proper operation using a Network Monitoring and Alarm system ("NMA"). The NMA™ system receives information regarding the network elements in the network and the facilities they provide and stores this information in data records in a facilities database. Data records are typically kept for each facility in the network that has been provisioned. Data records are also manually updated with system identification ("SID") information and alarm identification ("AID") information, which the NMA™ system uses when identifying the facility or equipment that is related to received status information.

A communication channel is also provided for each network element to use in communicating status information, such as alarm status information, regarding the equipment or provided facilities to the NMA™ system. When the NMA™ system receives status information from network elements, the NMA™ system attempts to associate the status information with the facility or equipment within the network that is related to the status information. The NMA™ system typically accomplishes the association by searching through its facilities database using the system identification and the alarm identification retrieved from the status message as search parameters, retrieving the data record that has the same SID and AID contained in it, and associating the status information with the retrieved data record. After associating the status information with the corresponding facility or equipment in the network, the NMA™ system can then report the status of the facility or equipment to a service technician.

SUMMARY

An improved monitoring system is provided for monitoring a communication network. In accordance with one aspect of the invention defined by the claims a computer-implemented system for associating a message received from a network element in a communication network to a data record stored in a database in a network monitoring system is provided. The computer-implemented system comprises a message matching module and a translation module. The message matching module is operative for extracting identification information from a first message received by the network monitoring system and for ascribing the received first message to an appropriate data record, wherein the appropriate data record corresponds to a facility or equipment in the communication network that relates to the received first message. The translation module is operative for determining search terms for use in selecting the appropriate data record. The translation module is also operative to convert the identification information into the search terms for use by the message matching module in selecting the appropriate data record.

In accordance with another aspect of the invention defined by the claims, a monitoring system for a communication network having a plurality of network elements is provided. The monitoring system comprises a communication subsystem for receiving a first message from a first network element, a database for storing a plurality of data records relating to facilities provided by the communication network or equipment provisioned in the communication network, a message matching module, and a translation module. The message matching module is operative to cause the monitoring system to associate the received first message to one of the data records. The message matching module is also operative to cause the monitoring system to extract identification information from the first message and to use the identification information to select said one of the data records wherein the selected data record corresponds to the facility or the equipment in the communication network that relates to the received first message. The translation module is applied in connection with the message matching module to allow the monitoring system to use the identification information to select said one of the data records. The translation module is operative to allow the monitoring system to convert the identification information into search terms for selecting one of the data records from the database.

In accordance with another aspect, a communication network is provided that comprises a plurality of network elements and a network monitoring system. The network monitoring system comprises a communication subsystem for receiving a first message from the first network element, a database for storing a plurality of data records relating to facilities provided by the communication network or equipment provisioned in the communication network, a message matching module, and a translation module. The message matching module causes the monitoring system to associate a received message to a data record. The message matching module has a data path to both the database and the communication subsystem. The message matching module is operative to cause the monitoring system to extract identification information from the message and to use the identification information to select said one of the data records wherein the selected data records corresponds to the facility or the equipment in the communication network that relates to the received message. The translation module is applied in connection with the message matching module to allow the monitoring system to use the identification information to select a data records. The translation module has a data path to the message matching module. The translation module is operative to allow the monitoring system to convert the identification information into search terms for selecting the data record from the database.

In accordance with another aspect of the invention defined by the claims, a method for reporting messages from network elements in a communication system to a network monitoring system is provided. The method comprising the steps of receiving a message from a network element, retrieving identification information from the message, and translating the identification information into search terms. The message further comprises the steps of searching a database using the search terms to identify a data record that corresponds to a facility or equipment the message relates to and posting content from the message to the identified data record.

BRIEF DESCRIPTION OF THE DRAWINGS

In order that the invention identified in the claims may be more clearly understood, preferred embodiments of structures, systems and methods having elements corresponding to elements of the invention recited in the claims will be described in detail by way of example, with reference to the accompanying drawings, in which:

DETAILED DESCRIPTION

Figure 1:
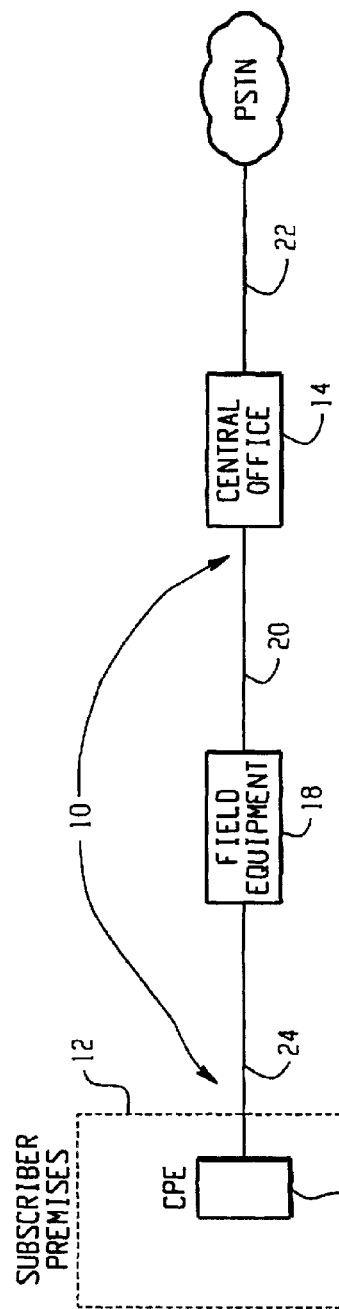
FIG. 1 is a block diagram of an exemplary section of a local access and transport area network.

With reference to the drawings, FIG. 1 is schematic diagram illustrating a portion of a telecommunication network, an exemplary section of a local access and transport area ("LATA") network 10. A subscriber's premises 12 is located at a first end of the LATA network section 10 and a central office ("CO") 14 is located at an opposite end of the LATA network section 10. At the subscriber's premises 12, a subscriber may have various types of customer premises equipment ("CPE") 16, such as conventional telephones, facsimile machines, private branch exchanges, voice mail systems, key telephone systems, computers, modems, telephone answering machines, alarm systems, and radio control systems, as well as many other devices. Various types of network elements ("NEs") are located at the CO 14. The NEs assist in providing communication channels between the CPE 16 at various subscriber premises. Examples of network elements that may be located at the CO 14 include Line interface units ("LIUs"), Multiplexers ("MUXs"), digital cross-connect systems ("DCS"), and other switching equipment.

There may be additional network elements that may reside in cabinets 18 in the field in the communication path between the CO 14 and the CPE 16. Examples of network elements that may reside in the cabinet 18 include coder/decoder (codec) equipment, multiplexers ("MUXs"), line interface units ("LIUs"), Optical network units ("ONUs"), digital loop carrier ("DLC") equipment, HDSL Line Units ("HLUs"), HDSL Remote Units ("HRUs"), and others.

In a typical LATA network section 10, trunks 20 may be provided as the physical media for information transmission between the cabinets 18 and the CO 14. Also, additional trunks 22 are preferable provided for use as the physical media for information transmission between the CO 14 shown and other COs in the Public Switched Telephone Network (PSTN). The trunks 20 and 22 may be constructed of various materials such as fiber optic cables, copper wire and others. Also, single sets of telephone wires 24 may be used to couple the CPE to the cabinets 18.

Figure 2:
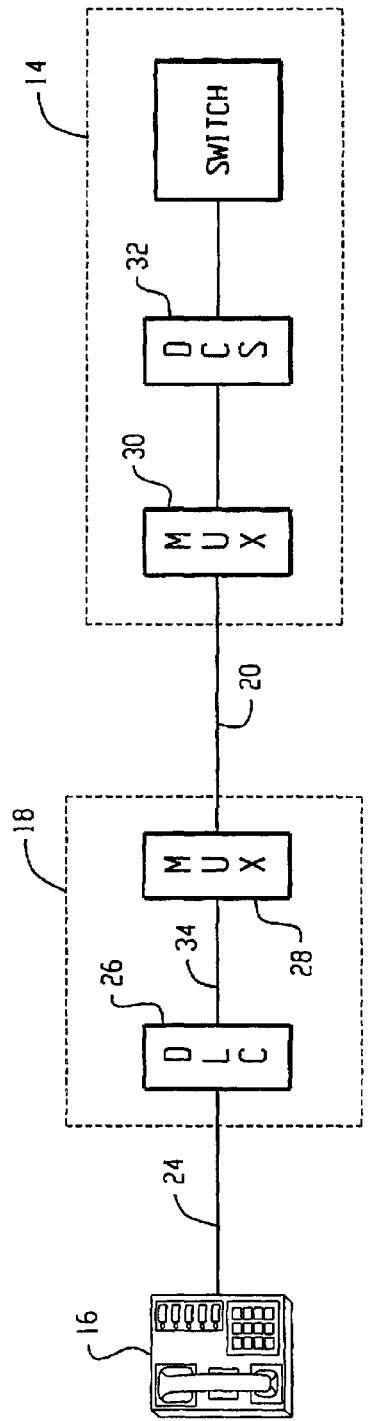
FIG. 2 is a more detailed block diagram of an exemplary section of a local access and transport area network.

Shown in FIG. 2 is a more detailed view of an exemplary LATA network section. In the example shown, the cabinet 18 includes, among other equipment, a digital loop carrier (DLC) 26 and a multiplexer 28. The CO 14 includes, among other equipment, a multiplexer 30 and a digital cross-connect system (DCS) 32. The DLC 26, MUX 28, MUX 30, and DCS 32 are examples of intelligent network elements. These network elements are capable of communicating status information regarding functions of internal components as well as external functioning of circuits the internal components of the equipment interact with.

Figure 3:
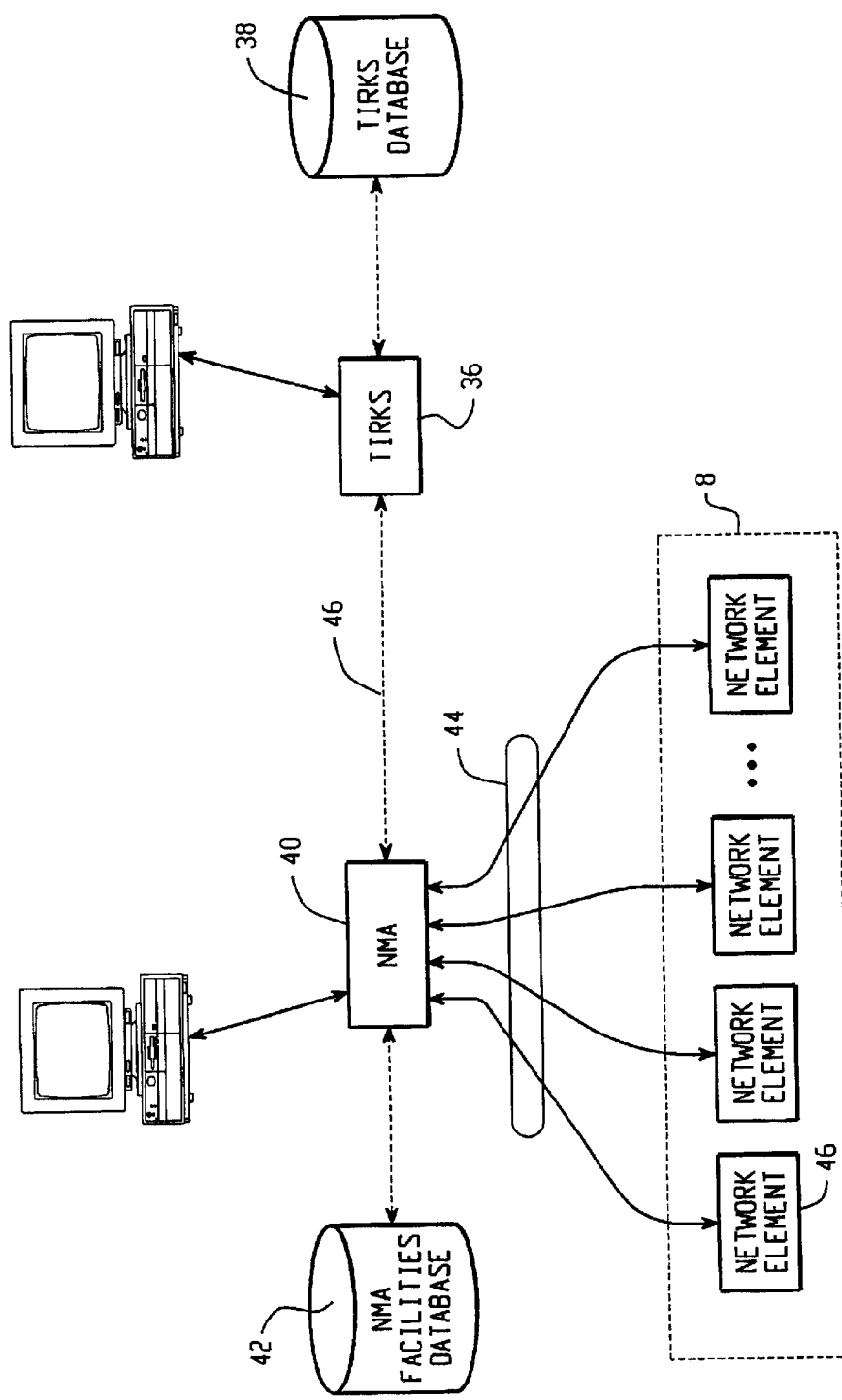
FIG. 3 is a schematic diagram of a network having a NMA system and a TIRKS system coupled thereto.

Referring now to FIG. 3, the provisioning of equipment and facilities in the network 10 is typically managed using the Trunk Integrated Record Keeping System (TIRKS) 36. TIRKS™ 36 is a Telcordia integrated, computerized network management system that supports the provisioning process for special service circuits, message trunks, and carrier circuits, and also provides inventory management of facilities and equipment. TIRKS™ 36 allows users to automatically log, route, and monitor the progress of work orders, perform end-to-end circuit design based on generic specifications and automated scripts, view and maintain an accurate, up-to-date inventory of all facilities and equipment and their assignments, execute interactive, user-defined queries and generate customized reports of work center activity, critical dates, and jeopardy conditions, and interface seamlessly with other Telcordia operations support systems. The inventory of facilities and equipment are maintained in a database 38.

For example, the exemplary DLC 26 has 84 internal circuits, each of which can support a telephone line between the CPE 16 and the DLC 26, and a 64K digital data line 34 between the DLC 26 and the MUX 28. Each of these circuit is referred to as a facility and the DLC 26 can communicate status info regarding each facility. In addition, the exemplary MUX 28 is an OC-3 MUX that can support 672 DS0 data lines. The MUX 28, therefore, has 672 facilities it can communicate status information regarding.

A network monitoring ("NM") system 40 is also typically employed with the network 10 to monitor the performance of an entire exchange network and provide an analysis trouble indication to repair forces. The preferred network monitoring system is the Telcordia Network Monitoring and Analysis ("NMA") operations system. The goal of the NMA™ system is to continuously monitor network elements, such as switches, line terminating equipment, multiplexes, channel banks, cross connects, etc., and transmission facilities, services, and equipment associated with the digital network by collecting alarm and performance data so that failures can be detected before customers become aware of them, impending problems can be anticipated from analysis of trends, and disruptive testing can be avoided as much as possible. Other examples of equipment that may be monitored include loop, interoffice, and interexchange carrier Point of Termination carrier facilities; digital cross connect systems (DCS), signal transfer points (STP), packet switches, automated digital terminal systems (ADTS), and multiplexed services such as Integrated Services Digital Network (ISDN), Public Packet Switched Service (PPSN), Common Channel Signaling (CCS), synchronization distribution network (SynchNet™) may also be monitored through the NMA™ system. In addition, power, plant, security, and other miscellaneous alarms associated with the network may be monitored through the NMA™ system.

The major functions of the NMA™ system include some or all of the following: monitoring the network; isolating the source of a problem, using a network topology database to determine which detected symptoms are causes and which are effects, establishing the severity of a problem based on the quantity or priority of the service affected; controlling the network element functions (e.g., protection switching), in order to rapidly restore service, diagnose complex problems in NEs by correlating the output messages they provide; predict impending failures by analyzing the collected data for performance trends; providing information on the current condition of all network elements to maintenance controllers, testers, and customer contact personnel; outputting all information needed to dispatch repair personnel properly; and verifying that repair activity has been effective using the subsequently collected performance data.

The NMA™ system performs its functioning by analyzing messages it receives from the various NEs. The various messages the NMA™ system may receive comprise alarms, status indications, and performance monitoring data. Alarms are self-reported indications of troubles in equipment or facilities. They occur when the equipment itself has recognized an abnormality. Status indications are binary indications that reflect the state of the equipment, but do not themselves identify a trouble. Performance monitoring data are numerical measurements of in-service parameters that are sensitive to the proper operations of equipment and facilities.

The NM 40 system includes a NM network facilities database 42. The facilities database 42 contains records reflecting the operating configuration of the network, i.e., the circuits, components, and equipment that have been provisioned for use. The database contains a record for each operational facility in the network. The information contained in the records are derived from information provided by TIRKS 36 to the NM system 40.

The NM system 40 exchanges messages with the NEs via one or more NE/NM communication paths 44. The messages are preferably communicated via a Public Packet Switched Network using the three layer X.25 protocol or the seven layer OSI protocol with messages written in TL1, the preferred command language. The NM system 40 may also exchange messages with Network elements using embedded interfaces, such as message exchanges with the Switching Control Center System (SCCS); message exchanges with E-Telemetry; and message exchanges with the Telecommunications Alarm and Surveillance and Control (TASC) system.

Figure 7:
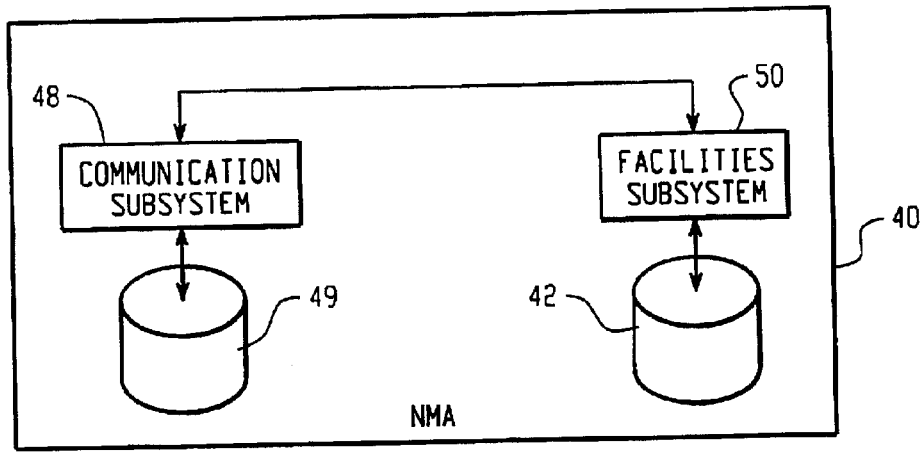
FIG. 7 is a block diagram illustrating components in the NMA system.

With reference to FIG. 7, the NM system 40 preferably comprises a communications subsystem 48 having storage means 49 and a facilities subsystem 50 having storage means 42. The communications subsystem 48 controls the NM system's communication with devices external to the NM system 40. The facilities subsystem 50 stores information relating to the configuration of the monitored network for use in alarm monitoring and reporting. The NM system also includes other subsystems not described herein.

Figures 4, 5, 6:
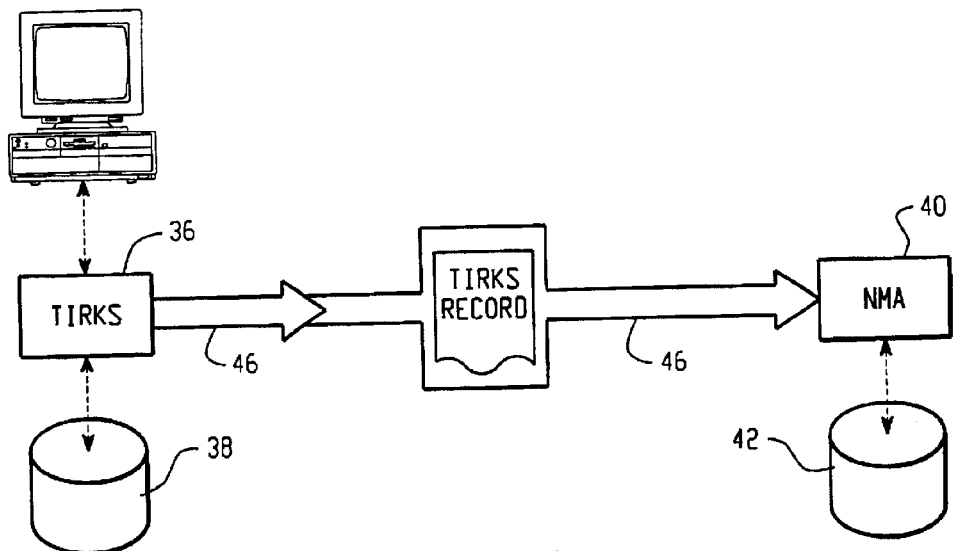
FIG. 4 is a block diagram illustrating an exchange of information from TIRKS to the NMA system.
FIG. 5 is a diagram illustrating the type of information provided by TIRKS to NMA.
FIG. 6 is a diagram that illustrates the type of information stored in a NMA record after updating with AID and SID information.

With reference to FIGS. 3 and 4, the NM system 40 is coupled to one or more TIRKS™ systems 36 via one or more TIRKS/NM communication paths 46. Preferably each communication path 46 is a permanent virtual channel (PVC) established via the CORBA interface. When a facility in the network 8 is provisioned, TIRKS™ 36 transmits information relating to the provisioned facility via the communication path 46 to the NM system 40. FIG. 5 illustrates the type of information provided by TIRKS™.

Figure 8:
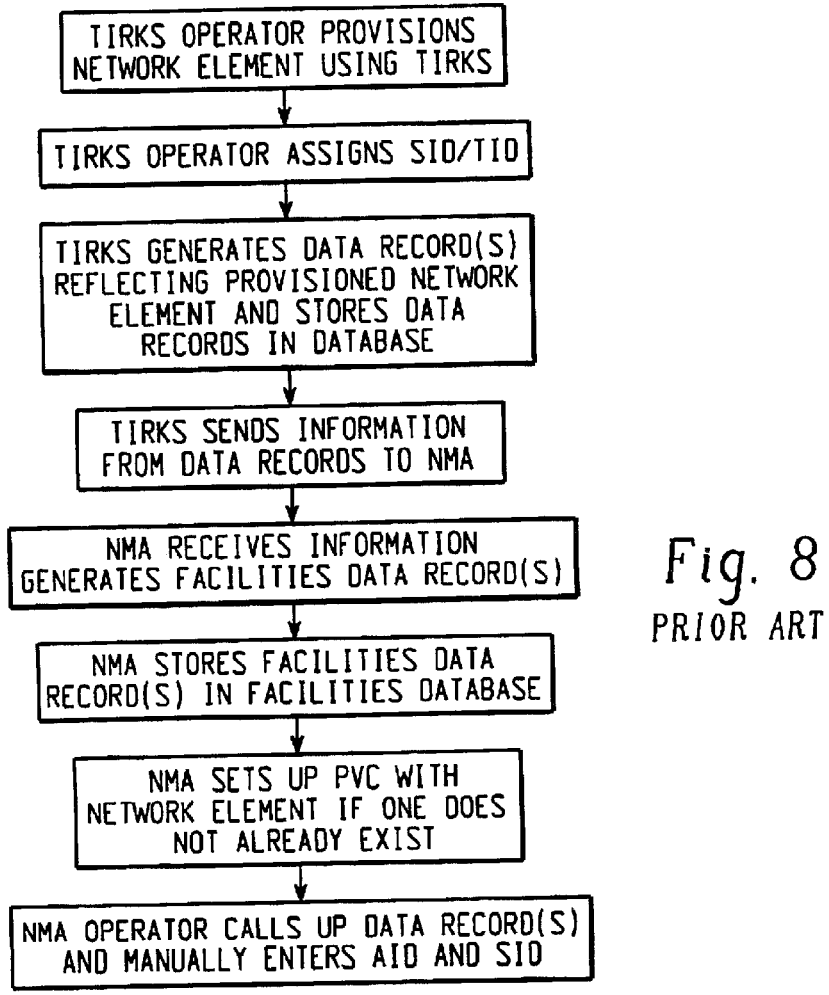
FIG. 8 is a flow chart illustrating a current method of generating NMA data records when provisioning a facility.

The NM system receives over the communication path 46, the information transmitted by TIRKS™ and then generates one or more NM data records that reflect the information provided by TIRKS™. The NM system 40 stores the data records preferably in the NM facilities database 42. The NM system 40 also establishes a NE/NM communication path 44, with the NE 46 that provides the facility being provisioned if a path 44 has not already been established. The NE/NM communication path 44 preferably is a PVC established in accordance with the X.25 protocol. Additionally, one or more NM system operators preferably retrieve the newly added NM data records and manually associate SID (system identification) information and an AID (alarm identification) information with each data record that corresponds to a facility that has an assigned SID and AID. FIG. 5 illustrates an exemplary facilities data record before the AID and SID have been appended to the data record and FIG. 6 illustrates an exemplary facilities data record after the AID and SID have been manually appended. An exemplary process for generating the data records in the NM facilities database is illustrated in FIG. 8.

The SID is established by a TIRKS operator during the provisioning process, entered into a separate area in TIRKS, and is caused to be programmed into the NEs during provisioning. The AID information is established by the equipment manufactures and defined by the vendor, e.g., through hardcode within the NE's software.

Figure 9:
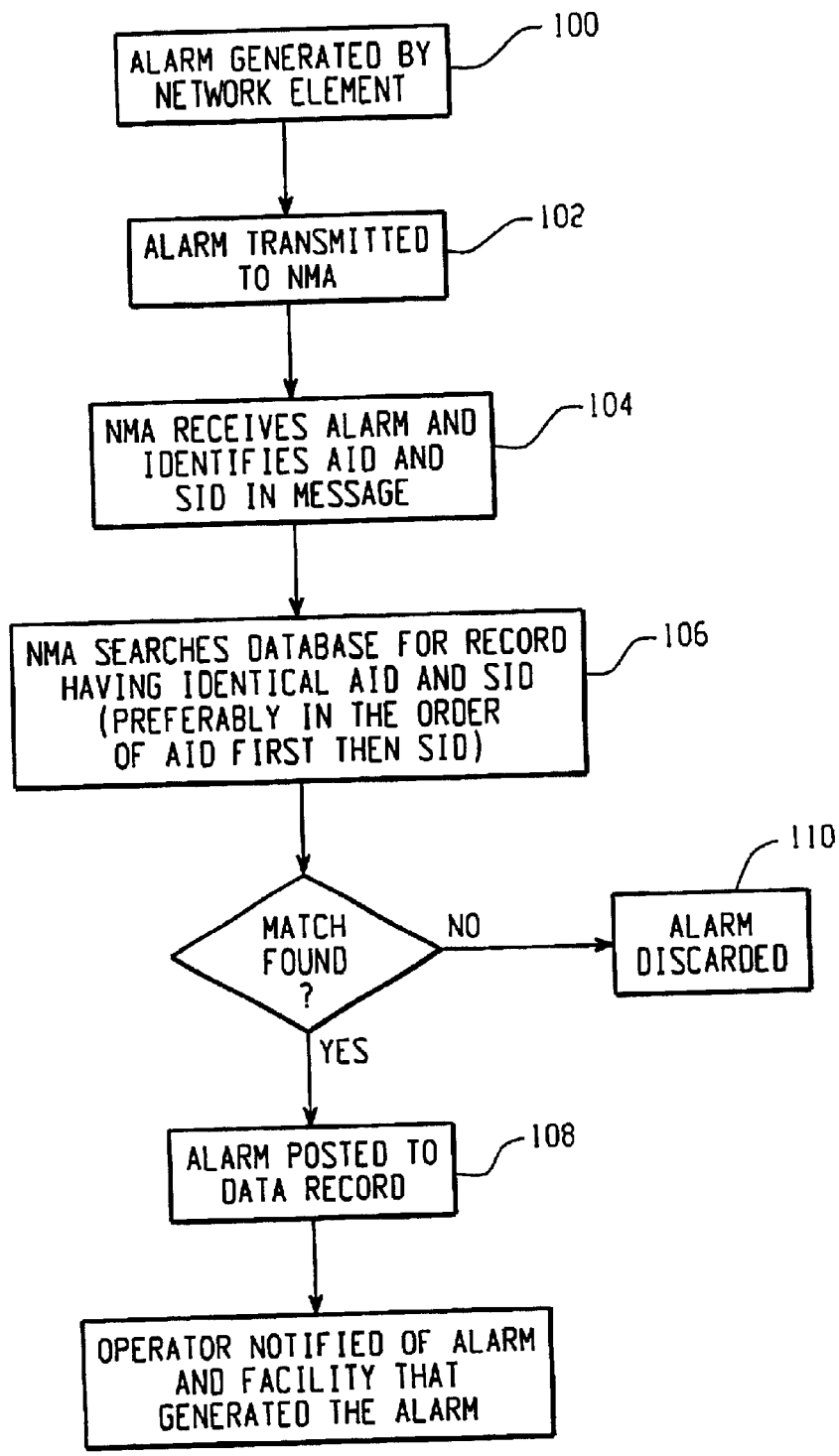
FIG. 9 is a flow chart illustrating a current method of recording exception messages.

As illustrated by the exemplary process of FIG. 9, when an abnormal condition occurs with a facility or NE 46, the affected NE 46 generates an alarm message (step 100) and transmits the alarm to the NM system 40 (step 102) via the NE's communication path or PVC 44. The NE will include in the alarm message the assigned SID and AID associated with the entity, i.e., equipment or facility, experiencing the abnormal condition.

When the alarm is received, the NM system 40 attempts to identify the facility for which the alarm is applicable. The NM system 40 performs the identification by comparing information contained in the alarm message to information contained in the data records. In particular, after the NM system receives the alarm message, the NM system 40 identifies the AID and SID in the alarm message (step 104). The NM system 40 then uses the AID and SID to search the facilities database for the data record that contains SID and AID that identically matches the SID and AID found in the status message (step 106). When a match is found, the NM system 40 then associates the status message with the facility or equipment to which the status message is applicable (step 108). Other parts of the NM system 40 can then use the alarm information to diagnose problems, isolate the source of a problem, predict impending trouble, provide information on the current condition of network elements, etc. If a match is not found, the alarm gets discarded and placed into an error buffer (step 110).

The NM system's effectiveness is limited by the accuracy of its facilities database. In other words if the NM facilities database 42 does not accurately reflect the current state of the monitored network 8, i.e., the data record for each facility does not have the correct AID and SID posted to it, the NM system 40 cannot associate a message with the correct facility thereby limiting the NM system's effectiveness in diagnosing problems, isolating the source of a problem, predicting impending problems, and providing information on the current condition of network elements, etc.

The NM facilities database 42 may have some inaccuracies due to inaccuracies in TIRKS 36. Discrepancies may occur from data entry errors, equipment not being installed as planned, discrepancies between the actual plug-ins shipped from those expected, substitutions or errors by field personnel, etc.

The current method for updating the NM system 40 if a discrepancy is detected is typically a manual procedure. For example, a field technician may discover the discrepancy. Next, the field technician notifies a TIRKS operator to update the TIRKS database. Then, the TIRKS operator updates the TIRKS database. Next, either the field technician or the TIRKS operator must then notify a NM system operator of the discrepancy. Then, the NM system operator must then manually update the NM network facilities database 42. With the current system there is a great possibility that even if a discrepancy is detected, the NM system 40 may never get updated and consequently, alarms could occur that do not get analyzed by the NM system 40.

Figure 10:
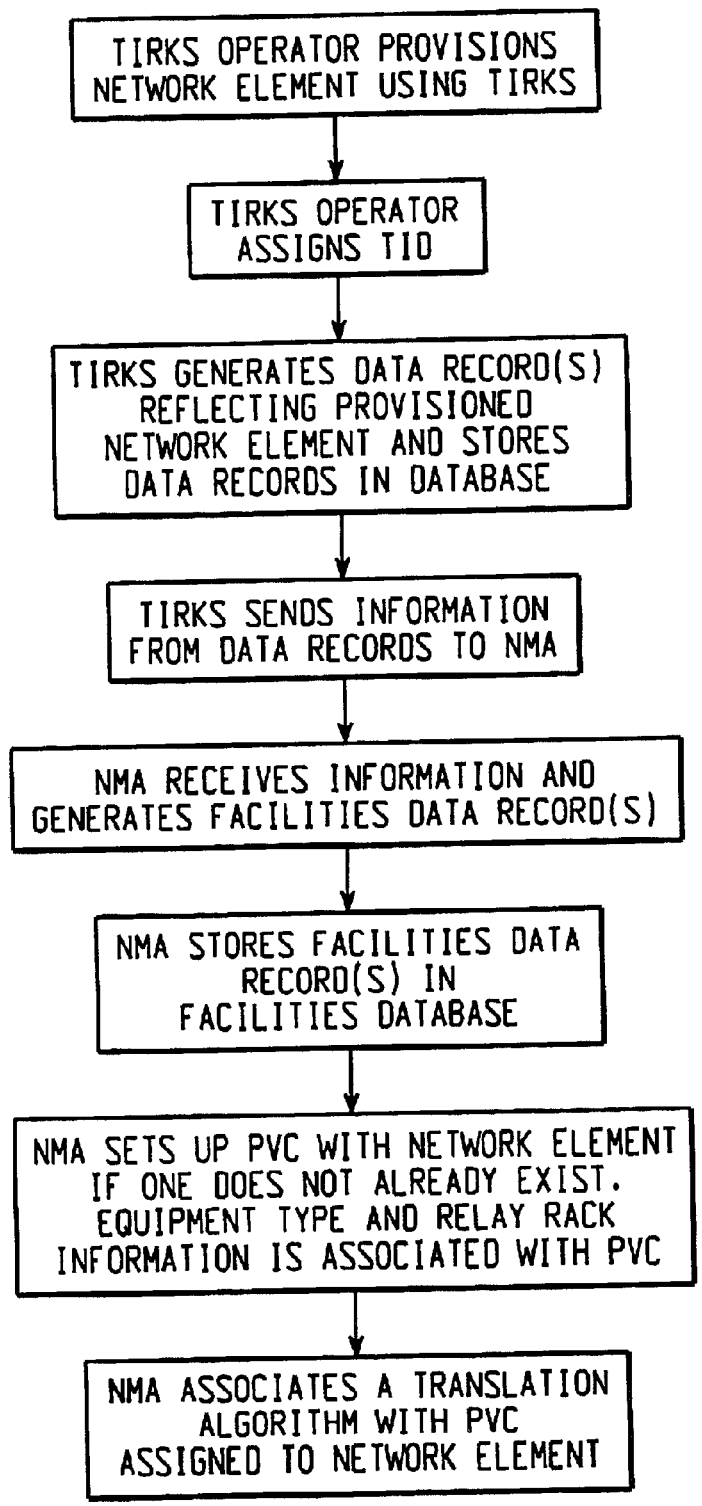
FIG. 10 is a flow chart illustrating a preferred method of generating NMA data records when provisioning a facility.

The improved network monitoring system is not solely dependent on the manual appending of AIDs and SIDs to data records in the facilities database. As illustrated by the exemplary process shown in FIG. 10, the NM facilities database record generation process in the improved system is similar to that of the current system. The most significant difference is that the NM operator no longer has to manually enter SIDs and AIDs to the data records.

Figure 11:
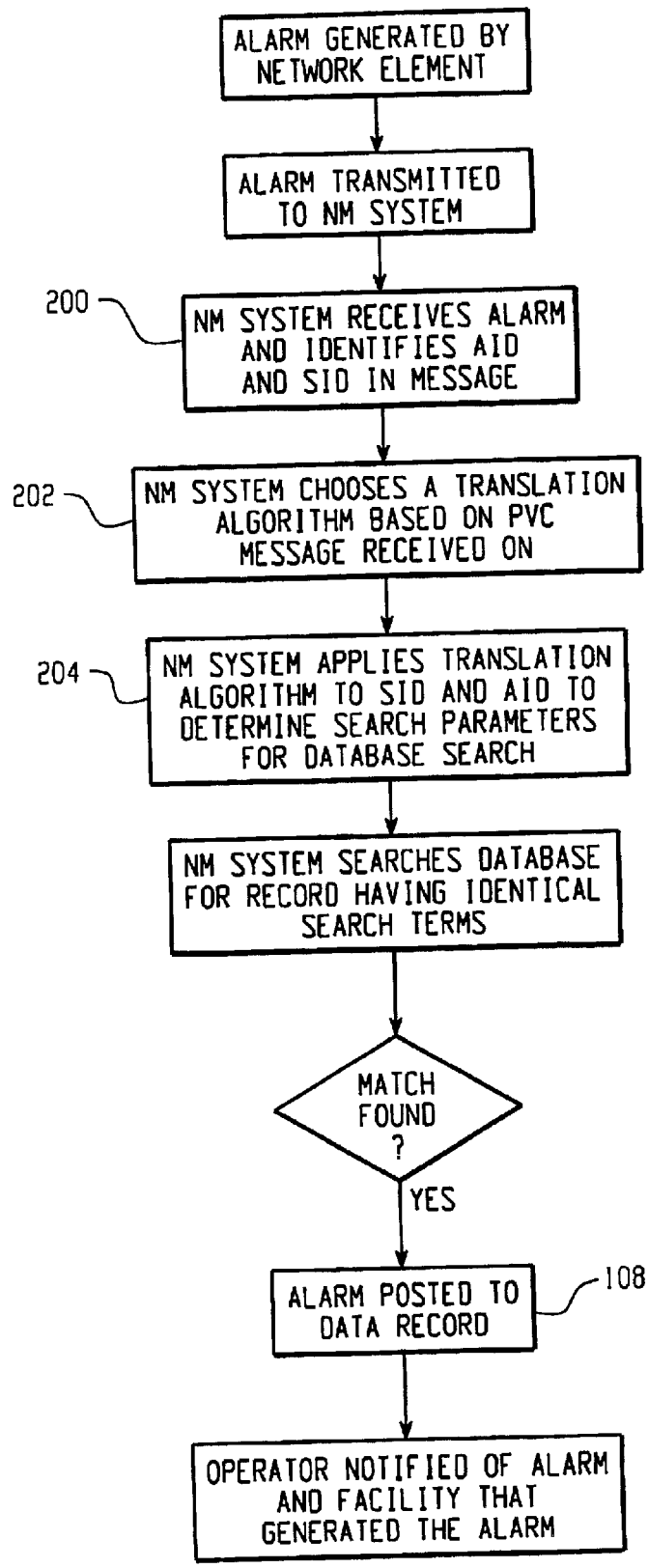
FIG. 11 is a flow chart illustrating a preferred method of recording exception messages.

As illustrated in the exemplary process shown in FIG. 11, when an alarm message is received by the NM system, a message matching module associated with the NM system applies a translation module to identify search parameters to use in retrieving the record pertaining to the facility that caused the alarm to be generated. The translation module preferably comprises a plurality of translation algorithms each of which are matched to an equipment type. The appropriate translation algorithm is preferably chosen based on the PVC or communication path on which the alarm message was received. Because each NE is assigned a unique PVC or communication channel, the NM system has a way of uniquely determining the equipment type for the facility that is related to the alarm message. With knowledge of the equipment type, the translation algorithm that is appropriate for that equipment type can be chosen.

Consequently, when an alarm is received by the NM system, the NM system identifies the AID and SID (step 200) and chooses a translation algorithm based on the communication channel the alarm message was received on (step 202). After choosing the correct translation algorithm, the NM system translates the SID and AID in the alarm message to search parameters for use in a database search (step 204). Also, because the NM system, when it assigns the PVC, knows the NE's relay rack location, the NM system can determine the relay rack location from knowing the PVC on which the alarm message arrived.

The number of parameters needed to uniquely identify a data record in the facilities database may vary. For example, a facility associated with a multiplex (MUX) may require three parameters to uniquely identify its corresponding data record: the location code, the unit/shelf designation, and the relay rack location. A facility associated with a NGDLC (next generation digital line carrier) or DCS, on the other hand, may only require two parameters to uniquely identify its corresponding data record: the rack location and the unit/shelf designation.

Figures 12A, 12B, 12C:
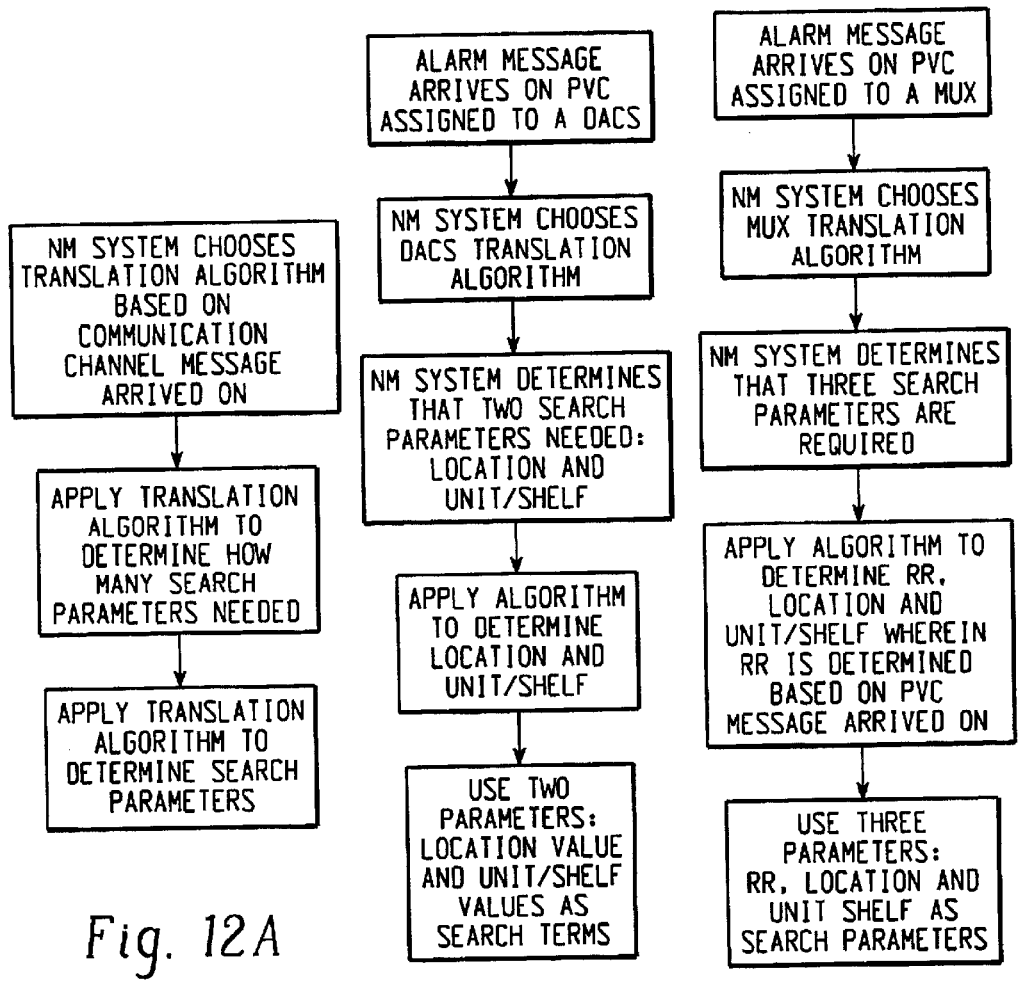
FIGS. 12A, 12B, and 12C are flow charts illustrating variations in the preferred translation algorithm.

FIGS. 12a, 12b and 12c are flow charts that provide examples of variations in the translation algorithm that could be utilized due to differences in the number of search parameters needed to uniquely identify a data record. FIG. 12a is a more generic example and FIG. 12b and FIG. 12c are related to particular types of NEs. For example, as shown in FIG. 12b with a DCS, only two search parameters are needed to uniquely identify a data record: the location value and the unit/shelf value. In this example, the NM system would choose the specific DCS (e.g., DACS II™) algorithm because the alarm arrived on a specific type of DCS (DACS II™) PVC. The NM system would be informed by the algorithm that two search parameters are required. The NM system would then apply the algorithm to determine the two values that would be necessary to identify the unique record in the NM. For a MUX, as illustrated in FIG. 12c, three search parameters would be needed.

The following table illustrates exemplary translations:

| Equipment | AID | SID | # of Search Terms | Location | Unit/Shelf | RR |
|---|---|---|---|---|---|---|
| Lucent Technology DACS II ™ | 6 | LSVLKYAPK32 | 2 | lsvlkyapk32 | 0006 | Can be retrieved from location and unit/shelf in NM database |
| Alcatel Network Systems 1631/1633 | T1-3437 | MOBLALAZK31 | 2 | moblalazk31 | 03437 | Can be retrieved from location and unit shelf in NM database |
| Lucent Technology DACS III/IV ™ | 0001-01 | BWLGKYMAK35 | 2 | bwlgkymak35 | 000101 | Can be retrieved from location and unit shelf in NM database |
| MUX | main-2 | BRHMALU0291 DM2032711 | 3 | brhmalu0291 | oliu-main-2 | 01cab.01a |
| NGDLC | 0110-12 | BRHMALMTLTS2010200 | 2 | Brhmalmt | 0110-12 | Can be retrieved from location and unit shelf in NM database |

As the table illustrates, the location, unit/shelf, and relay rack parameters can be determined from the SID and AID information, respectively, with the correct translation algorithm.

The NM system uses the search parameters determined through the translation process to initiate a search in the facilities database to identify the data record corresponding to the alarm producing entity. The NM system can then post the alarm to the proper data record after performing the search.

Figure 13:
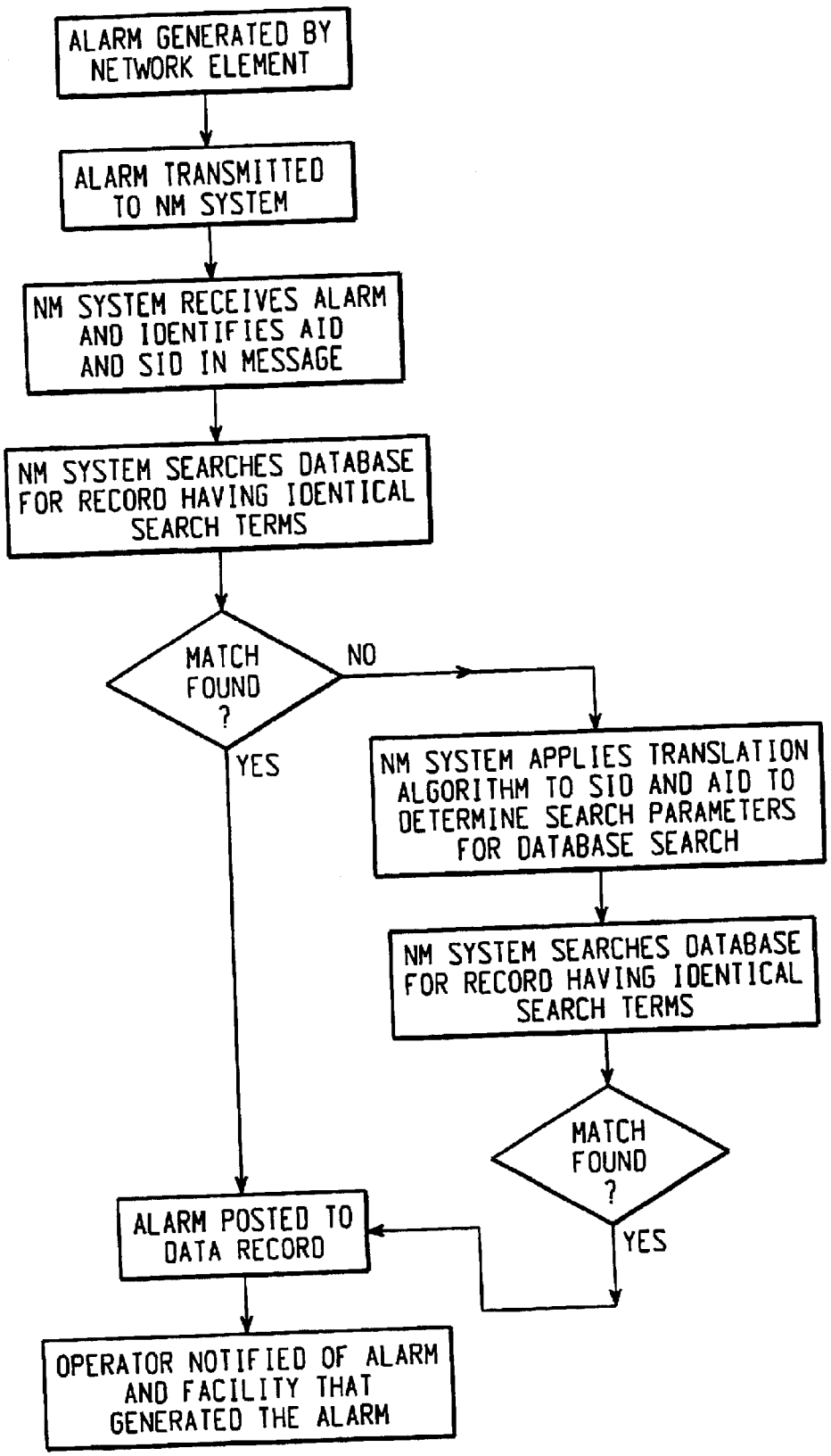
FIG. 13 is a flow chart illustrating a preferred method of recording exception messages.

The NM facilities database 42 could contain data records that have AIDs and SIDs included in them and contain records that due to design or unintentionally lack AIDs or SIDs. As illustrated in the exemplary method of FIG. 13, multiple searching methods could be implemented in such a database. For example, the database could first search for a desired data record using an AID and a SID. If the desired data record has an AID or SID included in it then the search would yield the desired record. If the desired record was not located through the search, the NM system could next apply an appropriate translation algorithm to identify search parameters to use to find the desired data record. If the algorithm could not find a matching SID and AID pair, the algorithm would post the alarm to the parent equipment location, i.e. the overall entity. This overall entity can be identified by the type of entity that it is. The parent entity for any equipment within the NM is defined as the bay entity. This entity is defined by the location and relay rack information. This would be a failsafe or catch all device that would prevent alarms from being missed.

Figure 14:
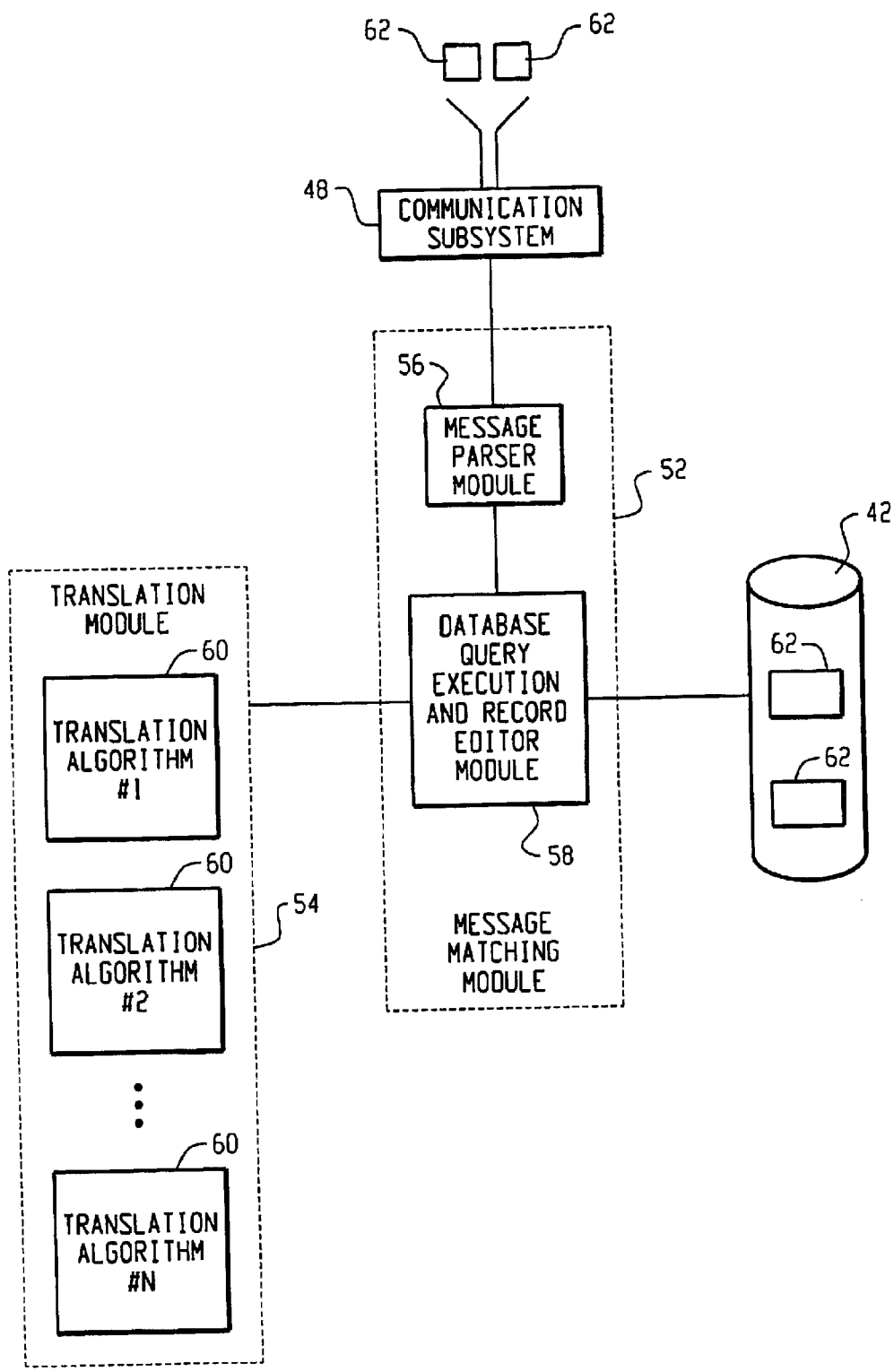
FIG. 14 is a block diagram of a preferred monitoring system.

Illustrated in FIG. 14 is a preferred network monitoring system that incorporates a preferred message matching module 52 and a preferred translation module 54. The term module as used herein is a generic term used to describe any entity such as hardware, software, firmware, or a combination of the above that causes the execution of some function. The preferred message matching module 52 comprises a message parser module 56 and a database query execution and record editor module 58. The preferred translation module 54 comprises a plurality of translation algorithms 60.

When a message 62 is received by the NM system from a NE, the message parser module 56 retrieves the identification information from the message. The identification information preferably comprises AID and SID information. The message matching module 52 also receives from the communication subsystem 48 information regarding the type of NE that sent the message. The translation module, based on the type of NE that sent the message, determines the appropriate translation algorithm 60 to employ and the number of search parameters to provide to the message matching module 52. The appropriate translation algorithm 60 is employed and the translation module 54 provides the message matching module 52 with the search terms needed to identify the data record 62 in the facilities database 42 that relates to the received message. The database query execution and record editor module 58 uses the search terms to locate the appropriate data record 62 and posts the message, which it receives from the message parser module 56, to the data record 62.

Other variations from these systems and methods should become apparent to one of ordinary skill in the art without departing from the scope of the invention defined by the claims. The preferred embodiments have been described with reference to an NM system but the invention described by the claims could be applicable to other network monitoring systems wherein the NMA system is the preferred network monitoring system.

The embodiments described herein and shown in the drawings are examples of structures, systems or methods having elements corresponding to the elements of the invention recited in the claims. This written description and drawings may enable those skilled in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims. Although the embodiments have been described with reference to alarm message handling, it is understood that the invention applicable to handling other types of messages such as status and date performance messages. It is also to be understood that the invention is not limited to use with the NMA system or TIRKS unless explicitly limited by the claims.

What is claimed is:

1. A computer-implemented system for associating a message received from a network element in a communication network to a data record stored in a database in a network monitoring system, the computer-implemented system comprising:

a message matching module for extracting identification information from a first message received by the network monitoring system and for ascribing the received first message to an appropriate data record, wherein the appropriate data record corresponds to a facility or equipment in the communication network that relates to the received first message; and a translation module for determining search terms for use in selecting the appropriate data record, the translation module being operative to convert the identification information into the search terms for use by the message matching module in selecting the appropriate data record.

2. The system according to claim 1 wherein the translation module is operative to determine the number of search terms needed to select the appropriate data record.

3. The system according to claim 1 wherein the translation module comprises a plurality of translation algorithms for converting the identification information into search terms, wherein each translation algorithm is specific to an equipment type.

4. The system according to claim 1 wherein the identification information from the first message does not exactly match information contained in the appropriate data record.

5. The system according to claim 1 wherein the network monitoring system receives a plurality of messages each having specific identification information and wherein none of the specific identification information exactly matches information contained in any of the data records.

6. The system according to claim 1 wherein the network monitoring system receives a plurality of messages each having specific identification information and wherein some of the specific identification information exactly matches information contained in one of the data records and some of the specific identification information does not exactly match information contained in any of the data records.

7. The system according to claim 1 wherein the plurality of network elements comprise at least one network element from a set of network elements consisting of a multiplexer, a digital cross connect system, a digital loop carrier, and a next generation digital loop carrier.

8. The system according to claim 1 wherein the first message is one of a set of messages comprising an alarm message, a status indication message, and a performance monitoring data message.

9. The system according to claim 1 wherein the identification information comprises alarm identification ("AID") information and system identification ("SID") information.

10. The system according to claim 9 wherein the AID is used to derive a first of the search terms and the SID is used to derive a second of the search terms.

11. The system according to claim 10 wherein the translation module comprises a plurality of translation algorithms, each translation algorithm being operative to convert the AID to the first search term and the SID to the second search term, each translation algorithm being specific to an equipment type, and wherein a plurality of the translation algorithms are different.

12. A monitoring system for a communication network having a plurality of network elements, comprising:
a communication subsystem for receiving a first message from a first network element;
a database for storing a plurality of data records relating to facilities provided by the communication network or equipment provisioned in the communication network;
a message matching module for causing the monitoring system to associate the received first message to one of the data records, the message matching module being operative to cause the monitoring system to extract identification information from the first message and to use the identification information to select said one of the data records wherein said one of the data records corresponds to the facility or the equipment in the communication network that relates to the received first message; and
a translation module that is applied in connection with the message matching module to allow the monitoring system to use the identification information to select said one of the data records, the translation module being operative to allow the monitoring system to convert the identification information into search terms for selecting said one of the data records from the database.

13. The system according to claim 12 wherein the translation module is operative to determine the number of search terms needed to select the appropriate data record.

14. The system according to claim 12 wherein the translation module comprises a plurality of translation algorithms for converting the identification information into search terms, wherein each translation algorithm is specific to an equipment type.

15. The system according to claim 12 wherein the identification information from the first message does not exactly match information contained in the appropriate data record.

16. The system according to claim 12 wherein the network monitoring system receives a plurality of messages each having specific identification information and wherein none of the specific identification information exactly matches information contained in any of the data records.

17. The system according to claim 12 wherein the network monitoring system receives a plurality of messages each having specific identification information and wherein some of the specific identification information exactly matches information contained in one of the data records and some of the specific identification information does not exactly match information contained in any of the data records.

18. The system according to claim 12 wherein the plurality of network elements comprise at least one network element from a set of network elements consisting of a multiplexer, a digital cross connect system, a digital loop carrier, and a next generation digital loop carrier.

19. The system according to claim 12 wherein the first message is one of a set of messages comprising an alarm message, a status indication message, and a performance monitoring data message.

20. The system according to claim 12 wherein the identification information comprises alarm identification ("AID") information and system identification data ("SID") information.

21. The system according to claim 20 wherein the AID is used to derive a first of the search terms and the SID is used to derive a second of the search terms.

22. The system according to claim 21 wherein the translation module comprises a plurality of translation algorithms, each translation algorithm being operative to convert the AID to the first search term and the SID to the second search term, each translation algorithm being specific to an equipment type, and wherein a plurality of the translation algorithms are different.

23. A communication network, comprising:
a plurality of network elements including at least a first network element and a second network element; and
a network monitoring system comprising,
a communication subsystem for receiving a first message from the first network element;
a database for storing a plurality of data records relating to facilities provided by the communication network or equipment provisioned in the communication network;
a message matching module for causing the monitoring system to associate the received first message to one of the data records, the message matching module having a data path to each of the database and the communication subsystem, the message matching module being operative to cause the monitoring system to extract identification information from the first message and to use the identification information to select said one of the data records wherein said one of the data records corresponds to the facility or the equipment in the communication network that relates to the received first message; and
a translation module that is applied in connection with the message matching module to allow the monitoring system to use the identification information to select said one of the data records, the translation module having a data path to the message matching module, the translation module being operative to allow the monitoring system to convert the identification information into search terms for selecting said one of the data records from the database.

24. The network of claim 23 wherein the translation module is operative to determine the number of search terms needed to select the appropriate data record.

25. The network of claim 23 wherein the translation module comprises a plurality of translation algorithms for converting the identification information into search terms, wherein each translation algorithm is specific to an equipment type.

26. The network of claim 23 wherein the identification information from the first message does not exactly match information contained in the appropriate data record.

27. The network of claim 23 wherein the network monitoring system receives a plurality of messages each having specific identification information and wherein none of the specific identification information exactly matches information contained in any of the data records.

28. The network of claim 23 wherein the network monitoring system receives a plurality of messages each having specific identification information and wherein some of the specific identification information exactly matches information contained in one of the data records and some of the specific identification information does not exactly match information contained in any of the data records.

29. The network of claim 23 wherein the plurality of network elements comprise at least one network element from a set of network elements consisting of a multiplexer, a digital cross connect system, a digital loop carrier, and a next generation digital loop carrier.

30. The network of claim 23 wherein the first message is one of a set of messages comprising an alarm message, a status indication message, and a performance monitoring data message.

31. The network of claim 23 wherein the identification information comprises alarm identification ("AID") information and system identification ("SID") information.

32. The network of claim 31 wherein the AID is used to derive a first of the search terms and the SID is used to derive a second of the search terms.

33. The network of claim 32 wherein the translation module comprises a plurality of translation algorithms, each translation algorithm being operative to convert the AID to the first search term and the SID to the second search term, each translation algorithm being specific to an equipment type, and wherein a plurality of the translation algorithms are different.

34. A method for reporting messages from network elements in a communication system to a network monitoring system, the method comprising the steps of:

receiving a message from a network element;

retrieving identification information from the message;

translating the identification information into search terms;

searching a database using the search terms to identify a data record that corresponds to a facility or equipment the message relates to; and posting content from the message to the identified data record.

35. The method of claim 34 further comprising the steps of:

identifying the type of network element that sent the message using the knowledge of the communication channel over which the message was received; and choosing a translation process based on the type of network element that sent the message.

36. The method of claim 34 wherein the search terms do not identically match the identification information.

37. The method of claim 34 wherein a plurality of messages are received, the database comprises a plurality of data records, each of the plurality of messages includes specific identification information, and none of the specific identification information identically matches any information contained in any of the plurality of data records.

38. The method of claim 34 wherein a plurality of messages are received, the database comprises a plurality of data records, each of the plurality of messages includes specific identification information, some of the specific identification information identically matches information contained in at least one of the plurality of data records, and some of the specific identification information does not identically matches any information contained in any of the plurality of data records.

* * * * *